United States Patent Office 3,779,961
Patented Dec. 18, 1973

3,779,961
LACQUER BINDERS
Rolf Dhein, Krefeld-Bockum, and Hans-Jurgen Meissner and Rolf Kuchenmeister, Krefeld, Germany, assignors to Bayer Aktiengesellschaft, Leverkusen, Germany
No Drawing. Filed Aug. 2, 1971, Ser. No. 168,486
Claims priority, application Germany, Aug. 4, 1970, P 20 38 768.2
Int. Cl. C08g 5/20
U.S. Cl. 260—19 U                    4 Claims

ABSTRACT OF THE DISCLOSURE

The invention of the present application are binders for aqueous lacquers, which can be applied in the customary manner, but especially according to the electrodeposition lacquering process. A further subject of the invention is a process for the manufacture of such binders.

---

The subject of the present application are binders for aqueous lacquers, which can be applied in the customary manner, but especially according to the electrodeposition lacquering process. A further subject of the invention is a process for the manufacture of such binders.

Aqueous solutions of natural polyesters with acid numbers above 35, neutralised with basic compounds, have already been used for the manufacture of electrodeposition lacquers (Ind. Eng. Chem. 1934, 26, 882). Such polyesters are the naturally occurring shellac products with acid numbers of about 35 to 70. A disadvantage of the natural polyesters is that their composition fluctuates greatly depending on origin (H. Kittel, Farben- u. Lack-Kunststoff-Lexikon (Paint and Lacquer Synthetic Resin Encyclopaedia), 1952, page 661, paragraph 1). Such natural products are therefore poorly suited to the manufacture of high quality industrial lacquers.

Attempts have therefore been made to replace the natural polycarboxylic acid resins by synthetic polycarboxylic acid resins (British patent specification 972,169, U.S. patent specification 3,230,162 and German published specification 1,546,943). These synthetic polycarboxylic acid resins are maleate oils, styrene-modified maleate oils, maleate fatty acids, maleate resins, alkyd resins, and maleate-modified butadiene-diisobutylene copolymers, vinyl resins and acrylic resins. However it subsequently became necessary to improve the corrosion resistance and hardness of these polycarboxylic acid resins by adding phenolic resins, urea resins and melamine resins (German published specification 1,546,943, column 3, line 58). In the meantime, it has become known that such admixtures are not fully co-deposited and that therefore coatings of inhomogeneous composition result (Farbe u. Lack, 70, 823, (1964)). Furthermore, the resins frequently show inadequate resistance to hydrolysis (British patent specification 1,102,652, page 1, lines 23–29).

In order to eliminate these defects, attempts have been made to synthesise new polycarboxylic acid resins. These include adducts of maleic anhydride to polybutadiene oils, which, when reacted with water to give polycarboxylic acids, and in the form of their amine salts, can be diluted with water (German published specification 1,219,684 and British patent specification 1,102,652). Such raw materials offer certain advantages, since they cannot be saponified. However, they suffer from the defect that the lacquer films harden inadequately. Furthermore, the products are too highly viscous and very dark in colour (German published specification 1,920,496, page 1, line 5 from the bottom, and page 2, line 4 from the bottom). It was possible to eliminate these disadvantages when, instead of maleic anhydride, unsaturated fatty acids were added to polybutadiene oils (German published specification 1,920,496). This however produces technical problems which are difficult to solve, since only a part of the fatty acids originating from natural oils adds on, and the remainder has to be distilled from the resin melt in vacuo or in steam at high temperatures. Attempts have also already been made to add unsaturated fatty oils and maleic anhydride to polybutadiene. Since only gelled, unusable products were produced with the requisite amounts of maleic anhydride, it was subsequently necessary to resort to fumaric acid, which is significantly more difficult to obtain (British Pat. 1,154,174).

In order to improve the hardening of the lacquer coatings, a polybutadiene-maleic anhydride adduct, to which a condensation product of formaldehyde and a phenolcarboxylic acid is chemically bonded, has also already been used as a lacquer binder (compare German published specification 1,929,593).

The subject of the invention are polymeric products of 5–70% by weight of an unsaturated fatty acid ester, 5–20% by weight of maleic anhydride and 90–10% by weight of a polybutadiene oil of viscosity 3–100 poise at 20° C., containing co-condensed oil-reactive phenol-formaldehyde resins. These products, after hydrolysis of the maleic anhydride rings and subsequent salt formation, for example with amines, give lacquer raw materials which can be dispersed in water.

Particularly preferred lacquer raw materials consist of 5–30% by weight of fatty acid esters, 5–30% by weight of phenol-formaldehyde resin, 5–15% by weight of maleic anhydride and 25–85% by weight of polybutadiene oil.

The binders of the invention yield coatings which display superior corrosion protection, very good hardness and very good permanent elasticity, very high film resistance and quite exceptionally good levelling. Aqueous dispersions which in contrast to the known clear aqueous solutions and the previously used, also cloudy synthetic resin dispersions (German published specification 1,546,943, column 1, line 27) show excellent storage stability and still give smooth, dense and firmly adhering deposits even at extremely high voltages of 300 and 400 volt, are particularly suitable for coatings applied by the electrodeposition lacquering process. Clear, aqueous solutions based on the polymers according to the invention are less suitable for the electrodeposition lacquering process. They contain a high proportion of organic solvents or basic compounds, whereby the optimum deposition conditions are frequently lost. Such solutions are particularly suitable for the manufacture of aqueous lacquers which are applied by brushing, spraying, flooding, dipping or pouring.

Suitable polybutadiene oils for the manufacture of the binders according to the invention are those with viscosities of 3 to 100 poise, preferably 3–30 poise, at 20° C. The polybutadiene oils should preferably have iodine numbers of 300 to 500. By polybutadiene oil in the sense of the present invention there are to be understood the known, and optionally also modified, polybutadienes with central cis- and trans-double bonds and also vinyl double bonds. Preferably, 1,4-polybutadiene oils with more than 50% of double bonds in the cis position (German published specification 1,210,684) and polybutadiene oils with up to 40% of double bonds in the vinyl position are employed.

Unsaturated fatty acid esters are esters of higher unsaturated fatty acids and aliphatic alcohols. Dihydric or polyhydric aliphatic alcohols are particularly preferred. Examples of suitable alcohols are methanol, ethylene glycol, propanediol, neopentyl glycol, butanediol, glycerol, perhydrobisphenol, trimethylolpropane and pentaerythritol. In general, unsaturated oils in their natural composition are used as unsaturated fatty acid esters; examples which may be mentioned are soja oils, linseed oil, castor oil, groundnut oil, tall oil and other vegetable oils. It is however also possible to employ the unsaturated fatty acids on which these oils are based, in the form of their esters with the alcohols mentioned.

Phenol-formaldehyde resins in the sense of the present invention are oil-reactive phenolic resins from phenols and formaldehyde, their etherification products with alcohols, reaction products with natural resins or synthetic xylene-formaldehyde resins, such as are added to air-drying and hot-drying alkyd resins as additives for improving drying and hardness (Wagner Sarx: Lackkunstharze (synthetic resins for Lacquers), page 49 and page 54, Albertols and page 79, Tungophen B). Reaction products of alkylphenols and xylene-formaldehyde resins (Houben-Weyl, Methoden der Organischen Chemie (Methods of Organic Chemistry), 14/2, page 308 and page 318, Example 15) deserve very particular attention.

The process for the manufacture of the lacquer raw materials according to the invention is characterised in that unsaturated fatty acid esters, polybutadiene oil of low viscosity, maleic anhydride and phenol-formaldehyde resin are reacted at temperatures of 180 to 270° C., with exclusion of air. In this process, polymerisation inhibitors such as hydroquinone, tert.-amyl-hydroquinone, diphenylamine, copper or copper salts, for example copper naphthenate, can be employed. The presence of such inhibitors is admittedly not absolutely essential for the process. It is possible to react all constituents of the lacquer raw material with one another in one stage. However, preferably the unsaturated fatty acid ester is first added to the phenol-formaldehyde resin. This reaction preferably takes place at 180–270° C. Thereafter, polybutadiene oil is added in this case, preferably at 180–270° C., followed by maleic anhydride being added at 180–240° C.

Lacquer raw materials of which the acid numbers can be distinctly below the values to be expected theoretically are produced. An evolution of $CO_2$ which is measurable during the reaction suggests that the addition of maleic anhydride, apart from consisting of a Diels-Alder addition and a substituting addition, also consists of an addition involving the anhydride group, so that addition products containing keto groups are formed (Farbe and Lack 75, 419 (1969)).

To achieve optimum results in use as an electrodeposition lacquer binder, the maleic anhydride content of the polymers should be so chosen that, after prior splitting of the anhydride groups with water, if necessary, acid numbers of between about 50 and 120 result. Products of lower acid numbers are frequently no longer sufficiently dispersible in water, whilst resins with acid numbers of above 120 do not always give perfect coatings.

The neutralisation of the binders is preferably effected with amines. Suitable amines are, for example, aqueous dimethylamine and trimethylamine solutions, as well as ethylamine, diethylamine and triethylamine, propylamine and butylamine, ethanolamine, diethanolamine and triethanolamine, and N-methylethanolamine and N,N-dimethylethanolamine. However, ammonia and alkalis can also be used.

The degree of neutralisation depends on the acid number of the resins and should if possible not exceed 50–100%, and at high acid numbers, around 100, it tends to be the lower degrees of neutralisation which give the best deposition values of the electrodeposition lacquer.

The aqueous lacquer dispersions can be prepared with conjoint use of water-soluble and/or water-insoluble solvents, such as, for example, methanol, ethanol, propanol, isopropanol, ethylene glycol monomethyl ether, ethyl ether, isopropyl ether and butyl ether, diethylene glycol, monoethers and diethers of diethylene glycol, dimethylformamide, dimethylsulphoxide, dioxane, methyl ethyl ketone, cyclohexanone, benzine and xylene. If alcoholic solvents are used, half-esters can in part be formed. If it is desired to dissolve the polymers without reducing the acid number, it is advisable to convert the anhydrides into carboxyl groups by means of water, if appropriate in the presence of basic catalysts.

The amount of solvent in the aqueous lacquers can vary. Aqueous lacquers for the electrodeposition lacquering process should however only contain small proportions of solvent, for example 10–30%, relative to the binder.

Pigmented aqueous lacquer dispersions can contain all customary pigments, fillers and lacquer auxiliaries, such as, for example, stabilisers, anti-foaming agents or emulsifiers. The aqueous lacquers for the conventional lacquering processes can additionally contain admixed water-soluble phenolic resins, urea resins or melamine resins.

The aqueous electrodeposition lacquers should have a solids content of 5–25%, and preferably 10–20%. Very highly concentrated pastes which have been neutralised to the extent of less than 50% are frequently advisable as topping-up material for electrodeposition lacquers.

The coatings produced from the aqueous electrodeposition lacquers are distinguished by particularly good levelling, very good elasticity coupled with good hardness, very high film resistance and very good corrosion protection.

EXAMPLE 1129 parts of soja oil are reacted with 1323 parts of an oil-reactive phenolic resin manufactured from substituted phenols and xylene-formaldehyde resins by condensation (compare Houben Weyl: Methoden der Organischen Chemie (Methods of Organic Chemistry), 14/2, page 318) having a softening point of 100–120° C. and a viscosity of 40–110 cp. (50% strength in xylene at 20°) in a nitrogen atmosphere at 260°, until a clear product of viscosity 58" (70% strength in xylene, according to DIN 53,211) has been produced. 1840 parts of this "oil-resin boiled mixture" are treated with 2,565 parts of a polybutadiene oil of viscosity approx. 750 cp. at 20° C., an iodine number of approx. 300, and a 32% content of double bonds in the vinyl position, relative to the total number of double bonds. The mixture was warmed to 260° over the course of 2 hours and left at this temperature until a viscosity of 39" (70% strength in xylene) was reached.

Finally, a binder which can be converted into valuable electrodeposition lacquers was manufactured by adding 471 parts of maleic anhydride to 3,907 parts of the reaction product of soja oil, phenolic resin and polybutadiene oil and reacting at 180° until a viscosity of 116" (50% strength in xylene) was reached.

The anhydride groups of the binder are split at 90° with water in the presence of traces of triethylamine, and the resin is then dissolved in ethylene glycol monobutyl ether so that a solution of approx. 80% solids content is produced. The acid number, relative to the binder, is then approx. 90. If 50% of the acid groups are neutralised with triethylamine and the neutralised solution is diluted with water to 10% binder content, a dispersion having a pH value of 8 and a conductivity of 900 $\mu$S is obtained.

From this dilute aqueous dispersion, clear lacquers can be deposited on metal, and when these lacquers are cured in 30' at 170° they yield very smooth, firmly adhering, dense and extremely resistant lacquerings.

An aqueous lacquer which also has the same solvent composition and the same degree of neutralisation, and which additionally contains 2% of carbon black, relative to the binder, can be deposited at 200° volt and whilst having a deposition equivalent of only 66 C/g, a pH value of 7.8 and a conductivity of 1135 $\mu$S, gives very smooth lacquerings of good levelling characteristics, which after a stoving time of 30' at 170° possess a pendulum hardness of 68" and an elasticity of 9.5 mm. according to Erichsen, adhere excellently and give good corrosion protection. The film resistance is $8.10^7$ $\Omega$·cm.

Patent claims:

1. A polymeric product which is the reaction product of 5–70% by weight of an unsaturated fatty acid ester, 5–20% by weight of maleic anhydride, 90–10% by weight of 1,4-polybutadiene oil having a viscosity of 3–100 poise at 20° C. and 5–30% by weight of an oil-reaction phenol-formaldehyde resin of the novolak type, said product having been obtained by initially reacting said phenol-formaldehyde resin with said ester at 180 to 270° C., then reacting resulting reaction product with said oil at 180 to 270° C. and then reacting the latter reaction product with said anhydride at a temperature of 180 to 240° C.

2. The polymeric product of claim 1 containing 5–30% by weight of said ester, 5–30% by weight of said phenol-formaldehyde resin, 5–15% by weight of said anhydride and 25–85% by weight of said oil.

3. The polymeric product of claim 1 wherein said oil-reactive phenolic resin of the novolak type is the reaction product of an alkylphenol and a xylene-formaldehyde resin.

4. A lacquer composition containing, as binder, a polymeric product of claim 1.

References Cited
UNITED STATES PATENTS

| | | | |
|---|---|---|---|
| 3,230,162 | 1/1966 | Gilchrist | 204—301 |
| 3,532,613 | 10/1970 | Gilchrist | 260—19 |
| 3,438,931 | 4/1969 | Mitchell | 260—38 |

OTHER REFERENCES
Skeist, "Handbook of Adhesives," 1962, p. 298.

DONALD E. CZAJA, Primary Examiner

W. E. PARKER, Assistant Examiner

U.S. Cl. X.R.

204—130, 301; 260—38